Figure 1:
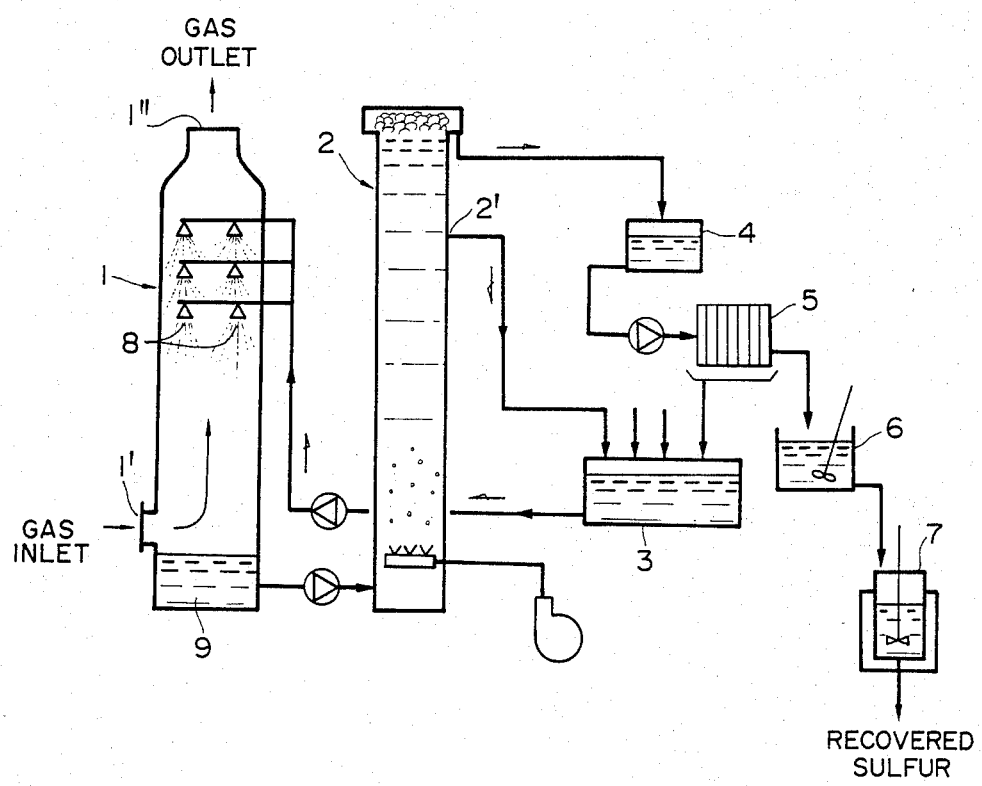

United States Patent [19]

Tajiri et al.

[11] Patent Number: 4,532,118
[45] Date of Patent: Jul. 30, 1985

[54] PROCESS FOR REMOVAL OF HYDROGEN SULFIDE FROM GASES

[75] Inventors: Tadaaki Tajiri; Hitoshi Nishizawa, both of Hyogo, Japan

[73] Assignee: Kimura Chemical Plants Co., Ltd., Hyogo, Japan

[21] Appl. No.: 594,913

[22] Filed: Mar. 29, 1984

[51] Int. Cl.$^3$ .................. B01D 53/34; C01B 17/05
[52] U.S. Cl. .................... 423/226; 423/229; 423/573 R
[58] Field of Search .......... 423/224, 226, 573.6, 423/573 R, 228, 229

[56] References Cited

U.S. PATENT DOCUMENTS

| | | | |
|---|---|---|---|
| 3,068,065 | 12/1962 | Hartley et al. | 423/228 |
| 4,036,942 | 7/1977 | Sibeud et al. | 423/226 X |
| 4,278,646 | 7/1981 | Lynn et al. | 423/226 |

Primary Examiner—Earl C. Thomas
Attorney, Agent, or Firm—Oblon, Fisher, Spivak, McClelland & Maier

[57] ABSTRACT

A process for the removal of hydrogen sulfide from a gas which comprises contacting the gas with a solution comprising ferric ions ($Fe^{3+}$) and ferrous ions ($Fe^{2+}$). The solution further comprises ethylenediamine tetraacetic acid (EDTA) or a salt thereof and triethanolamine (TEA) or a salt thereof. The solution has a pH in the range of from 7 to 9 and a mole ratio of ferric ion to total iron ions in the range of from 0.60 to 0.90 as measured just after the hydrogen sulfide contacts the solution. The process is characterized by high removal of hydrogen sulfide, prevention of side reactions, and the inhibition of the formation of intermediate colloidal sulfur.

9 Claims, 2 Drawing Figures

A. DESULFURIZATION

B. SIDE-REACTION

C. YIELD OF COLLOID

PROCESS FOR REMOVAL OF HYDROGEN SULFIDE FROM GASES

This invention relates to a process for the removal of hydrogen sulfide ($H_2S$) present in gases. More particularly, this invention relates to a process where an aqueous solution containing chelated iron ions is used as catalytic absorption liquor to contact with a $H_2S$-containing gas, by which gas-liquid contact $H_2S$ is oxidized and sulfur (S) is freed.

Heretofore U.S. Pat. No. 3,068,065 has proposed that polyvalent iron ions embraced in chelating compounds as catalyst are made to contact with $H_2S$-containing gases, where trivalent ferric ions ($Fe^{3+}$) is reduced to bivalent ferrous ions ($Fe^{2+}$) while $H_2S$ is oxidized to give free sulfur. Then the spent reduced catalyst is regenerated by air-oxidation for re-use.

Chemical reactions involved therein are noted as below;

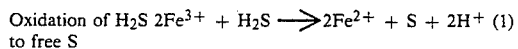
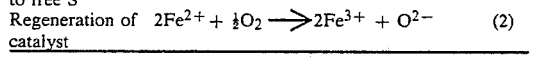
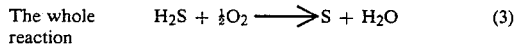

Oxidation of $H_2S$ to free S: $2Fe^{3+} + H_2S \longrightarrow 2Fe^{2+} + S + 2H^+$    (1)

Regeneration of catalyst: $2Fe^{2+} + \frac{1}{2}O_2 \longrightarrow 2Fe^{3+} + O^{2-}$    (2)

The whole reaction: $H_2S + \frac{1}{2}O_2 \longrightarrow S + H_2O$    (3)

Making reference to the reaction above, the oxidation (1) by chelated iron proceeds so rapidly and in the industrial practice the gas-liquid contact is carried out under a weak alkaline condition to promote the desulfurization. Specifically, the following reactions take place between the gas and the liquor;

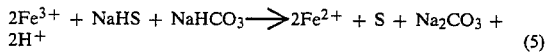

$Na_2CO_3 + H_2S \longrightarrow NaHS + NaHCO_3$    (4)

$2Fe^{3+} + NaHS + NaHCO_3 \longrightarrow 2Fe^{2+} + S + Na_2CO_3 + 2H^+$    (5)

$2Fe^{3+} + H_2S \longrightarrow 2Fe^{2+} + S + 2H^+$    (1)

The reaction mechanism involved therein is explained in that $H_2S$ contained in the gas first dissolves and diffuses into the absorption liquor in the form of NaHS with action of $Na_2CO_3$ [refer to (4)] and then by strong oxidizing function of the catalyst, NaHS is oxidized instantaneously to free S while the alkali compound is revived. However, the reactions (4) and (5) proceed so rapidly that a series of reactions between the gas and the catalyst liquor may be represented only by the formula (1).

In order to keep said iron ions dissolved aqueously, this invention uses chelating compounds of the combination of ethylenediamine tetraacetic acid or sodium salt thereof (hereinafter noted as EDTA) and triethanolamine (hereinafter noted as TEA), which are chosen by the inventors of this invention on the basis of experimental observations that TEA selectively forms stable chelated compounds with ferric ions in an alkaline aqueous solution and that EDTA tends to form the same one with both ferric or ferrous ions equally, but ferrous chelates thereof stay more stably in an aqueous solution than the other.

Problems involved in the desulfurization process by chelated iron as mentioned above are (1) Unreacted remaining NaSH dissociates to sodium sulfide ($Na_2S$) and $H_2S$, by which the degree in the removal of $H_2S$ is attenuated.

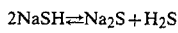

$2NaSH \rightleftharpoons Na_2S + H_2S$ (2) The same remaining NaSH increases a side-reaction as given below;

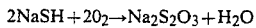

$2NaSH + 2O_2 \rightarrow Na_2S_2O_3 + H_2O$ (3) The reaction between ferrous ions and $H_2S$ yields iron sulfide (FeS), which will be mixed in the objective product, free sulfur, and will darken it in color at a melt-purification step in the downstream, thereby commercial value thereof will be impaired.

The object of this invention is to overcome the problems as recited above by performing said gas-liquid contact under the condition that a mole ratio of chelated ferric ions in the total chelated ferric and ferrous ions lies in the range of 0.60–0.90 in the act of the contact. Thus this invention is featured in that, in a process for oxidizing $H_2S$ through gas-liquid contact with an aqeuous solution containing iron ions chelated by EDTA and TEA, thereby to convert it to free S, said gas-liquid contact between the absorption liquor and the $H_2S$-containing gas is carried out within the pH range of 7–9, preferably 7.5–8.5, and also under the condition that a mole ratio of chelated ferric ions to the total chelated iron ions lies in the range of 0.60–0.90 as measured just after said contact takes place. It is to be noted here that this invention, as understandable from the above, intends to control a mole share of ferric ions and ferrous ions (hereinafter noted as ion ratio), in stead of a concentration of chelated irons in the absorption liquor. The inventors of this invention have found, as will be described and shown in a drawing hereinafter, that (A) the removal of $H_2S$, (B) the prevention of the side-reaction and (C) the inhibition of the formation of intermediate colloid sulfur can be favorably balanced by controlling said ion ratio within said range. Referring to the lower limit 0.60, factors (A), (B) and (C) have been found to vary critically across 0.60 as shown in the accompanying FIG. 2. And as for the upper limit 0.90, no further improvements in said three factors have been found above 0.90 where contrarily more burden will be borne to the regeneration step to economical disadvantage. And the range of said ion ratio should be based on measurements which are effected on samples acquired at the point just after the gas-liquid contact zone in the process. In other words, there may be employed to carry out said gas-liquid contact such a conventional gas-washing apparatus as a packed tower, a plate tower, a spray tower and the like. However, when a packed tower is employed, said ion ratio in this invention should be determined according to the analysis on liquor samples acquired just below the bottom of the packed zone in the tower.

Referring to other technical factors in connection with this invention, the pH range of 7–9 is set with the ground that a higher pH makes feasible a higher desulfurization degree, but the disadvantage is the trend that iron hydroxide and iron sulfide are ready to precipitate and that the necessary amount of alkali increases uneconomically above pH=9, and in the range below pH=7, a desulfurization becomes poor. The iron component, used as catalyst, may be initially supplied, for instance, in the form of ferrous sulfate and thereafter supplemented in an amount commensurate to loss and necessary exhaust. Therefore, in regard to supply balance, an amount comparable to be contained in recovered free sulfur in the form of colloid may be neglected. Referring to the supply of EDTA and TEA, it is preferred to maintain an amount of TEA to be at least 1.5 mole times an amount of EDTA in the liquor and it is also preferred to maintain an amount of EDTA at a level sufficient to chelate at least 60 mole % of the whole chelatable iron ions (on an absolute amount basis) present in the absorption liquor. This preferred requirement described above has been related to EDTA having complete full molecules, but EDTA is effective as catalyst even in the status of damaged or fouled molecules ascribed to natural deterioration during a long term use. Therefore it is to be noted here that the desulfurization by EDTA may be brought about not only by complete EDTA molecules.

As mentioned before, a means of carrying out said gas-liquid contacts may be chosen in various conventional apparatus and once an apparatus therefor is determined and engineering specifications are decided according to the composition and volume of the exhaust gas to be treated. Then the absolute amount and a suitable concentration of the iron chelate to be present in the absorption liquor will be theoretically calculated from the basis that one mole of $H_2S$ is, as shown in (1), equivalent to two moles of ferric ions. However generally two (2) to four (4) times the theoretical amount of chelated iron is preferred to be present in the liquor. And it is reasonable to keep concentration thereof at a lower level in consideration of possible loss in operation.

In the following, this invention will be explained by an embodiment thereof and technical data acquired therein, but the embodied process and data described hereinafter should not be construed to limit this invention.

In FIG. 1 which shows a diagrammatical process flow of the invention, the reference numeral 1 is an absorption tower where an exhaust $H_2S$-containing gas is made to contact with an absorption liquor containing chelated iron ions in counter-current manner, 2 is a regeneration or air-oxidation tower where reduced chelated iron ions due to oxidation of $H_2S$ is air-oxidized by air bubbles, 3 is a recycling tank where the absorption liquor, separated partially from a upper part of the tower 2, is introduced and the preparation for reuse is made by supplementing necessary catalyst materials and alkaline chemicals so as to provide required properties therewith.

In operation, an exhaust gas is introduced into the tower 1 at the gas-inlet 1' provided on a lower part of the tower and the inlet gas flows upword with counter-current contacts to the falling catalyst liquor sprayed by spray nozzles 8 equipped at an interior upper part of the tower and then the gas exits at the top thereof 1". Thus the catalytic absorption liquor containing free sulfur is stored in the tower bottom 9. Hereinbefore it has been noted that a value of the ion ratio in this invention should be within said range at the point just after the gas-liquid contact, and applying this requirement to the process as shown in Fig. 1, the absorption liquor staying in the bottom 9 should be within the range.

The liquor in the bottom 9 is next sent to the tower 2 where the liquor undergoes air-oxidation and part thereof is cut out at the exit 2' to go to the tank 3 while most of the liquor becomes afloat at the top of the tower 2. The frothy liquor at the top thereof is transferred to the tank 4, therethrough to the filterpress 5 where solid material consisting essentially of recovered S is separated from the liquor. Thereafter the sulfur passes a cake dissolver 6 and a melter 7 to become the finished recovered S.

Experiments have been made in a removal process similar to the process described above with variations with respect to concentrations of $H_2S$ present in exhaust gases in the range of 1000–3000 ppm, with respect to concentrations of chelated iron ion in absorption liquors in the range of 1000–2000 mg/l and with respect to pH in the range of 7.5–8.5. Results obtained therefrom are arranged and shown in FIG. 2 where it will be understood how the degrees of desulfurization, side-reaction and yields of intermediate colloid vary depending on mole ratios of ferric ions present to the total iron ions.

Figure 2:
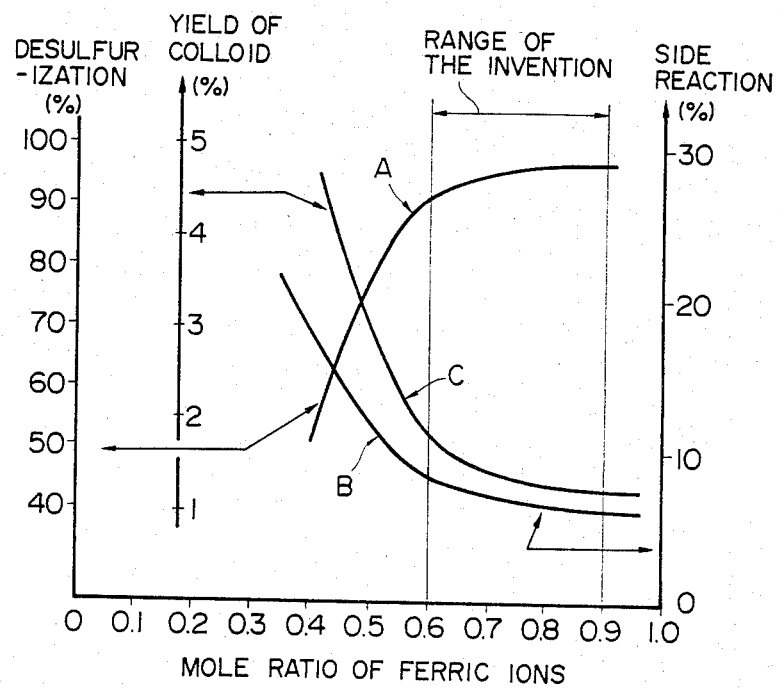

The ordinate values shown in FIG. 2 behave critically across the ion ratio=0.60. Specifically, in the range below 0.60, the side reaction rises as more colloid yields with result of more FeS. In contrast, in the range of a higher ion ratio, the side reaction and the yield of colloid tend to decrease with an attenuating increase in desulfurization. As for the desulfurization, it decreases sharply below the same 0.6, but increases attenuatingly at the same 0.80–0.90.

We claim:

1. A process for the removal of hydrogen sulfide from a gas comprising contacting said gas with a solution comprising ferric ions and ferrous ions, said solution further comprising ethylenediamine tetraacetic acid or a salt thereof and triethanolamine or a salt thereof, said solution having a pH in the range of from 7 to 9 and a mole ratio of ferric ion to total iron ions in the range of from 0.60 to 0.90, said mole ratio of ferric ion being measured just after said hydrogen sulfide contacts said solution.

2. The process of claim 1 wherein said pH is in the range of from 7.5 to 8.5.

3. The process of claim 1 wherein said gas is contacted with said solution in a packed tower, a plate tower, a spray tower or a combination thereof.

4. The process of claim 1 wherein said ferric ions and ferrous ions are initially supplied as ferrous sulfate.

5. The process of claim 1 wherein ferrous sulfate is added to the solution during said process.

6. The process of claim 1 wherein said triethanolamine is used in at least a 1.5 molar ratio excess relative to ethylenediamine tetraacetic acid.

7. The process of claim 1 wherein said ethylenediamine tetraacetic acid is used in an amount sufficient so that said ethylenediamine tetraacetic acid chelates at least 60 mole % of all chelatable iron atoms in solution.

8. The process of claim 1 wherein two to four moles of ferric ion are used for every one mole of hydrogen sulfide.

9. The process of claim 1 wherein said mole ratio of ferric ion to total iron ions is in the range of from 0.70 to 0.90.

* * * * *